United States Patent [19]

Townsley et al.

[11] Patent Number: 5,532,524
[45] Date of Patent: Jul. 2, 1996

[54] DISTRIBUTED POWER REGULATION IN A PORTABLE COMPUTER TO OPTIMIZE HEAT DISSIPATION AND MAXIMIZE BATTERY RUN-TIME FOR VARIOUS POWER MODES

[75] Inventors: David B. Townsley; Shaoan Chin, both of Cupertino, Calif.

[73] Assignee: Apple Computer, Inc., Cupertino, Calif.

[21] Appl. No.: 240,991

[22] Filed: May 11, 1994

[51] Int. Cl.$^6$ ........................................................ H02J 3/14
[52] U.S. Cl. .............................. 307/64; 307/66; 364/492; 364/707; 320/2; 320/14
[58] Field of Search ..................... 307/64, 66; 364/492, 364/707; 320/2, 14, 15, 64, 18; 395/750

[56] References Cited

U.S. PATENT DOCUMENTS

| | | | |
|---|---|---|---|
| 4,747,041 | 5/1988 | Engel et al. | 364/200 |
| 5,142,684 | 8/1992 | Perry et al. | 395/750 |
| 5,200,685 | 4/1993 | Sakamoto . | |
| 5,237,258 | 8/1993 | Crampton . | |
| 5,270,946 | 12/1993 | Shibasaki et al. . | |
| 5,287,053 | 2/1994 | Hutchinson . | |
| 5,300,874 | 4/1994 | Shimamoto et al. | 320/15 |
| 5,423,045 | 6/1995 | Kannan et al. | 395/750 |
| 5,430,881 | 7/1995 | Ikeda | 395/750 |

FOREIGN PATENT DOCUMENTS

| | | |
|---|---|---|
| 0404588 | 12/1990 | European Pat. Off. . |
| 0463593 | 1/1992 | European Pat. Off. . |
| 0469533 | 2/1992 | European Pat. Off. . |
| 0510814 | 10/1992 | European Pat. Off. . |

Primary Examiner—Willaim M. Shoop, Jr.
Assistant Examiner—Albert Paladini
Attorney, Agent, or Firm—Blakely, Sokoloff, Taylor & Zafman

[57] ABSTRACT

A system for distributing power throughout a computer system, preferably a portable computer, while still maintaining a desired power mode hierarchy so that the most critical components or circuits-within the computer system receive power before non-critical components. The system includes a micro-controller unit for controlling power allocations throughout the system. The system further includes a power connector for interfacing with a dual-line AC-to-DC adapter, a switching regulator for providing regulated DC power outputs to a central processing unit, memory unit and the like, a battery switching circuit having two battery packs to support simultaneous charging and sequential discharging of the battery packs in the event that the AC-to-DC adapter is decoupled from the computer system and an auxiliary battery source for supplying power to critical components in the computer system as a last resort.

34 Claims, 13 Drawing Sheets

DISTRIBUTED POWER REGULATION IN A PORTABLE COMPUTER TO OPTIMIZE HEAT DISSIPATION AND MAXIMIZE BATTERY RUN-TIME FOR VARIOUS POWER MODES

BACKGROUND OF THE INVENTION

1. Field of the Invention

The present invention relates to the field of computers. More particularly, this invention relates to a power distribution system and a method for distributing power regulating components throughout a computer system in order to lessen heat dissipation within a main computer casing.

2. Art Related to the Present Invention

Over the last decade, there have been many advances in semiconductor technology, semiconductor packaging and miniaturization. One result of these advances is the development of higher performance semiconductor devices defined as integrated circuits having additional and/or enhanced features (e.g., operating at greater frequencies) than prior semiconductor devices. These higher performance semiconductor devices have enabled computer manufacturers to build and design faster and more sophisticated computer systems and to integrate more features into a computer casing. However, a number of disadvantages have arisen with respect to the use of these higher performance semiconductor devices.

A paramount disadvantage is that such additional features and performance typically cause greater power consumption and heat dissipation as a by-product than prior computer designs with fewer integrated features. A second disadvantage associated with the sophisticated computer systems is that more heat is being dissipated by a number of power regulating components within the computer casing because they are supporting a larger range of requisite power levels. Finally, as a trend, the computer market is expecting and valuing smaller computer casings thereby driving computer designers (especially portable computer designers) to design power systems closer to a thermal limit of the smaller casing by integrating more features therein.

Referring to FIG. 1, a conventional power distribution system for a typical portable computer 1 is illustrated. The portable computer 1 comprises a main computer casing 2 for protecting inner circuitry of the portable computer 1 from damage and providing a mobile, convenient enclosure for carrying by hand or in one's briefcase. Such inner circuitry within the main computer casing 2 includes the improved semiconductor devices such as a processor, memory element, etc. (i.e., "core components") 3, modules such as hard disk, floppy disk drive and cursor control devices, as well as power regulating components. The portable computer 1 further comprises a display casing 4 including display hardware 5 (e.g., a backlight) operating in conjunction with a display screen 6, such as a liquid crystal display ("LCD").

Optionally, a conventional single line alternating current-to-direct current ("AC-to-DC) power adapter (the "adapter") 7 may be coupled via an adapter cable 13 to a power connector 8 of the main computer casing 2 so that the adapter 7 typically operates as a primary power source of unregulated DC power flowing into a motherboard switching regulator 9 of the portable computer 1. The motherboard switching regulator 9 is a major power regulating component for the core components 3 within the main computer casing 2 as well as for display hardware 5 and display screen 6 within the display casing 4. Unregulated DC power is likely supplied to the motherboard switching regulator 9 by the adapter 7 or a battery source 12.

Besides the motherboard switching regulator 9, a plurality of auxiliary power regulators are commonly used within the main computer casing 2 to regulate power. For example, multiple linear regulators 10 may be implemented within the main computer casing 2 in order to supply power outputs at a variety of different voltages or ripple requirements. Additionally, a charging regulator 11 may be implemented for regulating a power output to charge the battery source 12. The charging regulator 11 is required to properly charge the battery source 12 to some consistent voltage or current, while losses of power within the adapter cable 13 and fluctuating power demands of the computer through the motherboard switching regulator 9 work to undermine any consistency of power being delivered to the charging regulator 11. In this conventional power dissipation circuit, heat is generated by the core components 3, motherboard switching regulator 9, linear regulators 10 and the charging regulator 11 within the main computer casing 2.

A critical problem that exists in this conventional power distribution system is that the integration of higher performance processors and more features (i.e., brighter screens, more peripheral input/output ("I/O") support) into a smaller main computer casing causes greater amounts of heat to be dissipated within the smaller main computer casing 2 (i.e., a greater heat density). As a result, the overall temperature within the main computer casing 2 is drastically approaching or has arisen to a calculable boundary temperature known to adversely affect the reliability of the core and power regulating components within the main computer casing 2. In addition, due to the fact that heat is typically dissipated through the main computer casing 2 of portable computers, these machines may become more uncomfortable to work with when placed on the user's lap.

For conventional personal desktop computers solely receiving power from an AC outlet, heat can be adequately dissipated by implementing a fan element to exhaust heat from an interior of the main computer casing. However, for portable computers which may be operating in public environments and generally under battery power, this fan element would add audible noise and consumes additional battery power, which are crucial disadvantages in a competitive portable computer market.

Another problem is that the computer market places a high premium on smaller computer casings, causing portable computer designers to drive more features and create a greater heat density within the smaller main computer casing.

Another critical problem is that the conventional power distribution system can be less efficient as evidenced by the above-mentioned thermal dissipation problems and by not employing sufficient flexibility in power modes and switches to disable power to idle circuitry. As a result, such inefficiency indicates that power provided by the battery source is being needlessly wasted, reducing its run-life.

Yet another problem is that there does not exist an AC-to-DC adapter generating two adapter power outputs of which one of the adapter power outputs is dedicated to charging batteries within the computer system while the other adapter power output normally supplies power to the computer circuitry to run the computer system.

Hence, it is desirous to create a power distribution system which mitigates thermal dissipation within the main computer casing but still supports an hierarchical application of power ("power mode hierarchy") designed to first supply power to the most critical components. As a result, the higher performance semiconductor devices and adequate number of integrated electronic features could be implemented within a smaller main computer casing without causing excessive heat and reliability problems.

SUMMARY AND OBJECTS OF THE INVENTION

In light of the foregoing, it is apparent that there exists a need for reconfiguring a power distribution system to lessen thermal dissipation within the main computer casing. Hence, it is an object of the present invention to design a power distribution system which positions power regulating components outside the main computer casing.

Another object of the present invention is to provide a power distribution system which properly supplies power to various components and circuits according to a chosen power mode hierarchy so that those components and circuits most critical to the operation of the computer system receive power first.

Yet another object of the present invention is to provide a power distribution system which supports multiple modes of operation.

Another object of the present invention is to provide a power distribution system that utilizes a dedicated AC-to-DC adapter output for charging at least one battery.

Another object of the present invention is to provide a power distribution system which supports a dual battery pack construction.

It is also an object of the present invention to provide a power distribution system which effectively extends battery run-life by distributing power in a more efficient manner.

These and other objects of the present invention are provided by a power distribution system and method for distributing thermal dissipation within the computer casing through decentralization of power regulating components. The power distribution system comprises a power regulation circuit incorporated within the main computer casing and various power regulating components coupled to the power regulation circuit within a display casing and an external AC-to-DC adapter. The power distribution system is devised in such a manner that a minimal number of power regulating components are required in a main computer casing of the computer system. In addition, some power regulating components are implemented within an external AC-to-DC adapter and within display power regulating circuitry so that a motherboard switching regulator, a primary regulator within the main computer casing, is not required to regulate power before being transmitted to the display. Furthermore, the AC-to-DC adapter when used allows battery packs within the computer system to be charged without additional regulation within the main computer casing.

The power distribution system comprises a main power regulation circuit incorporated within the main computer casing and various secondary but independent power regulating components located within a display casing and an external AC-to-DC adapter. The power regulation control circuit includes a micro-controller unit which controls power allocation to various portions of the power system by activation and/or deactivation of bilateral FET switches or FET switches. The power system further includes a motherboard switching regulator to supply a regulated power output to core components and the micro-controller unit, battery switching circuitry to provide DC power to the motherboard switching regulator through a first or second battery pack and an auxiliary battery source for supplying power to the micro-controller unit and other critical components during "Shut-down" and "Sleep" power modes.

The power distribution system further comprises display power regulating circuitry within the display casing to regulate DC power supplied by either the AC-to-DC adapter or one of the battery packs and convert the possibly unregulated DC power into AC power for the backlight and regulated DC power at 5 Volts ("V") for the display itself. The display power regulating circuitry includes a DC-to-AC converter to convert the DC power into AC power for use by a display (e.g., backlight) and a DC-to-DC regulator to regulate the DC power to a display screen electronics. By performing such power regulation in the display casing, less thermal dissipation occurs in the main computer casing since the motherboard switching regulator undergoes less loading, reducing heat losses within the main computer casing.

Additionally, the AC-to-DC adapter, when coupled to the power regulation circuit, provides regulated DC power to not only the main power regulation circuit within the main computer casing, but also to the batteries for charging, eliminating the need for a charging regulator within the main computer casing. Although the display power regulating circuitry also receives regulated DC power from the AC-to-DC adapter, post regulation within the display casing is still necessary to meet the needs of the display (AC for the backlight, 5 V for the display screen) and to deal with unregulated DC power from batteries that can vary from 8 V to 12 V.

BRIEF DESCRIPTION OF THE DRAWINGS

The objects, features and advantages of the present invention will become apparent from the following detailed description of the present invention in which.

DETAILED DESCRIPTION OF THE PRESENT INVENTION

A power distribution system and method for distributing power regulating components throughout a computer system while still supporting a particular power mode hierarchy is described in detail. In the following description, for purposes of explanation, specific details such as power modes and circuit configurations are set forth in order to provide a thorough understanding of the present invention. However, it will be apparent to one skilled in the art that the present invention may be practiced without these specific details. In other instances, various devices, well-known circuitry and the like are not shown in order to avoid obscuring the present invention.

Through this reference, specific examples have been created for the sole purpose of illustrating operational power paths of the power distribution system in various primary power modes. These specific examples lend themselves to explaining the present invention and should not be construed as a limitation on the scope of the present invention.

Figure 1:
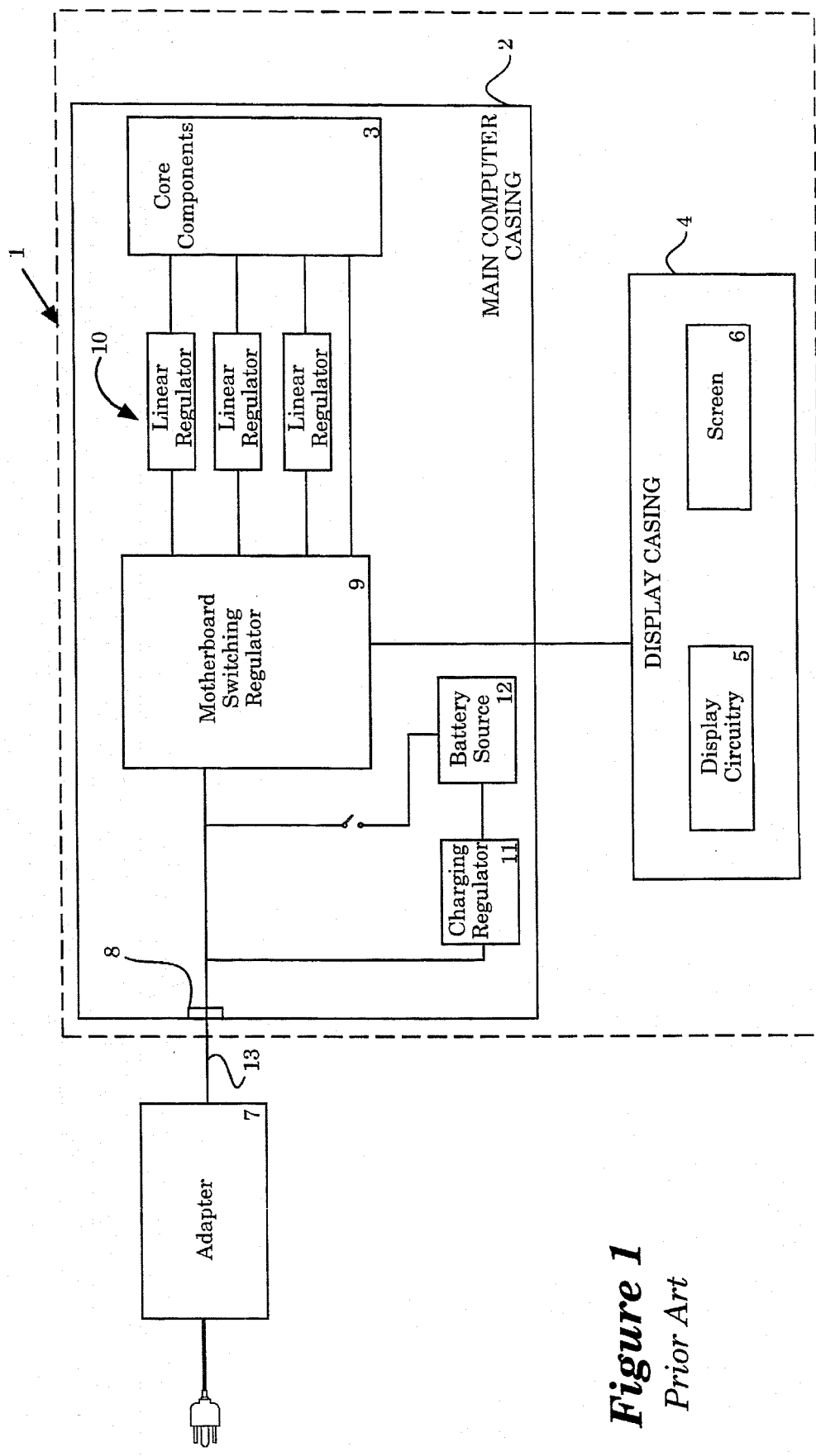
FIG. 1 is a block diagram of a conventional power distribution system of a portable computer.
Figure 2:
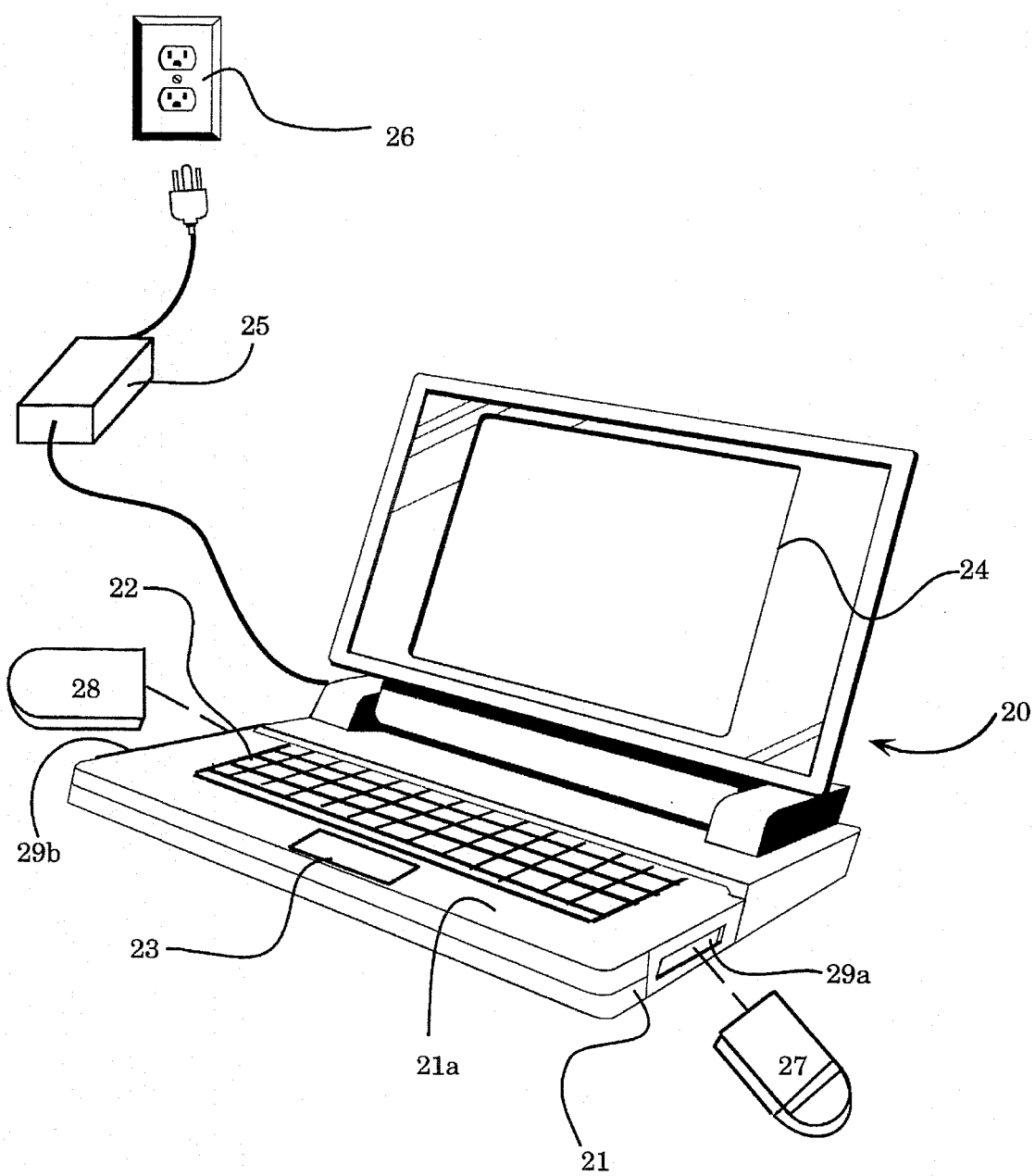
FIG. 2 is a perspective view of a computer system incorporating the present invention.

Referring to FIG. 2, an embodiment of a computer system 20 utilizing the present invention is illustrated. The computer system 20 generally comprises a main computer casing 21 incorporating conventional components within a computer system such as, for example, a central processing unit ("CPU"), memory as well as a micro-controller unit to control power allocation through certain power lines throughout the computer system 20. An alphanumeric keyboard 22 and a cursor control device 23 such as a touch pad or track ball are integrally constructed on a top surface 21a of the main computer casing 21 for easy access by a user. A display 24, typically a liquid crystal display or any conventional flat panel display in association with its display circuitry, is pivotally coupled to the main computer casing 21. The computer system 20 receives power from either an external AC-to-DC power adapter (the "AC-to-DC adapter") 25 coupled to a power supply 26 (e.g., a wall outlet supplying 110 Volts AC of ordinary house alternating current), or alternatively, from at least one or preferably two battery packs 27 and 28 connected to the computer system through a first and second battery bay 29a and 29b. It is contemplated that an alternative configuration may include a single battery pack upgradable to two battery packs with an option of including a system or feature expansion card for memory, graphics, processors, etc. in the other battery bay.

Figure 3:
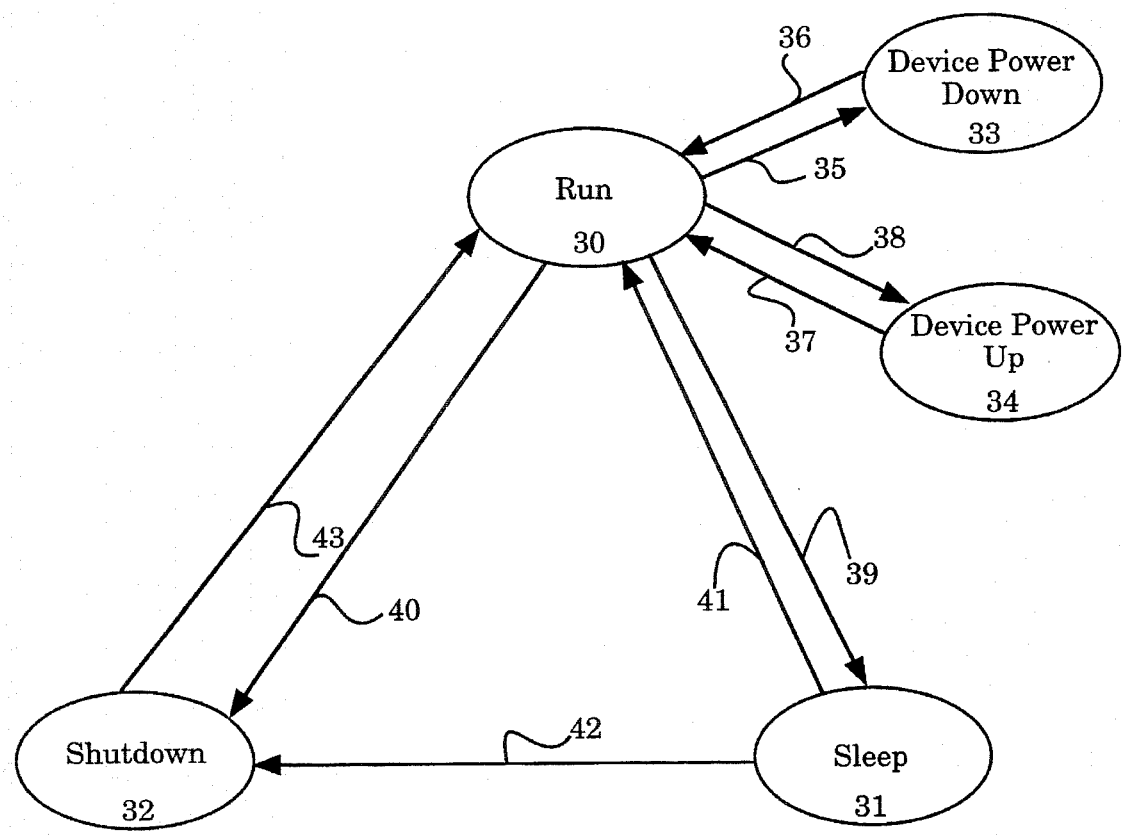
FIG. 3 is a state diagram illustrating the states supported by the power distribution system of the present invention as shown in FIG. 2.

Referring now to FIG. 3, a state diagram of a power mode hierarchy of the computer system is illustrated. This particular hierarchy assists in explaining various modes of power usage which may be experienced by the computer system during operation, and should in no way be construed as a limitation on available power mode hierarchies. In this hierarchy, the computer system may exist in three primary power modes (i.e., "Run," "Sleep" and "Shutdown") denoted by circles 30–32 or two secondary power modes (i.e., "Device Power Down" and "Device Power Up") denoted by circles 33 and 34, respectively.

Figure 9:
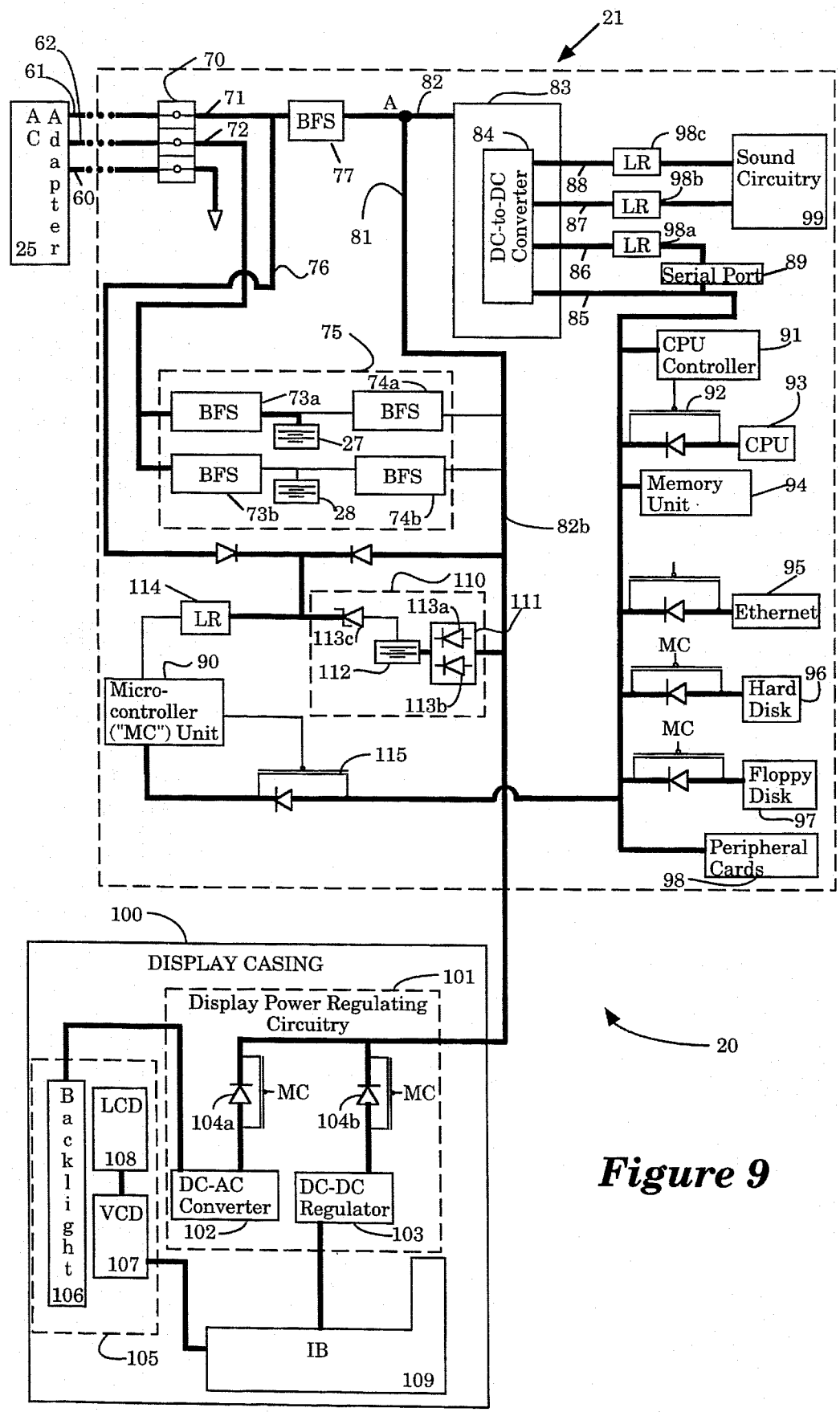
FIG. 9 is a detailed circuit diagram of the power distribution system of the computer system operating in Run mode in which the external AC-to-DC adapter is a primary power source of the computer system.
Figure 10:
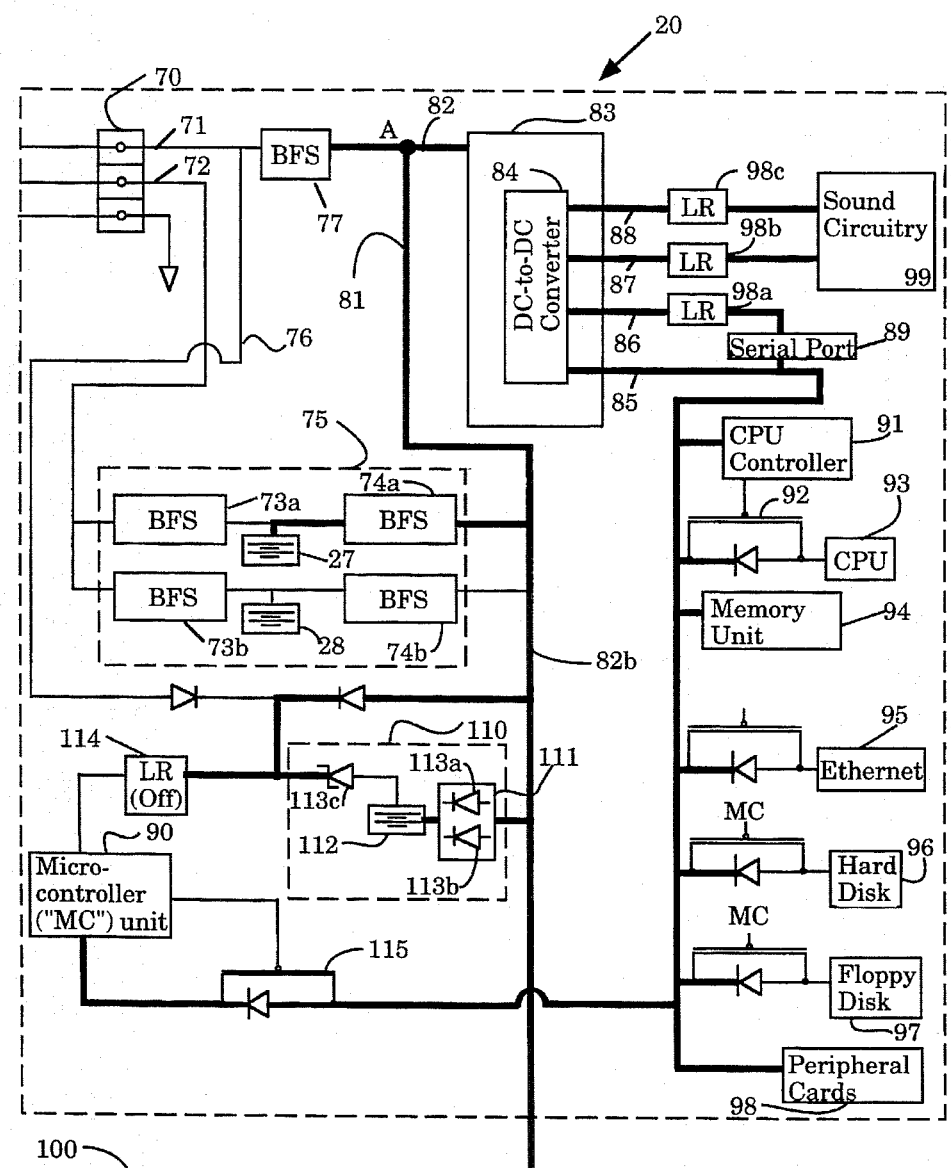
FIG. 10 is a detailed circuit diagram of the power distribution system of the computer system operating in Run mode in which a battery pack is a primary power source of the computer system.

The computer system exists in Run mode 30 when fully operational and powered by the external AC power adapter as shown in FIG. 9 or by a battery source as shown in FIG. 10. The Run mode 30 has four power mode transitions denoted by arrows 35, 38, 39 and 40 which represent possible transitions to other power modes after a particular event occurs. Otherwise, the computer system remains in the Run mode 30. As shown, in Run mode 30, the computer system may undergo a first power mode transition 35 to the Device Power Down mode 33 when a micro-controller unit, controlling power allocation of the power distribution system (discussed later in more detail), deactivates a particular I/O device. The computer system returns to the Run mode 30 upon completion of the first power mode transition 35 as shown in a return transition 36. Similarly, the computer system may undergo a second power mode transition 38 to Device Power Up mode when the micro-controller unit activates an I/O device and returns to the Run mode 30 via a return transition 37. Another (third) transition 39 to the Sleep mode 31 may occur upon detection by system software of one of a number of events such as menu selection by the user, inactivity for a certain time period or detection that battery power is below a certain level. A fourth transaction 40 is to the Shutdown mode which typically occurs through menu selection, reset of the micro-controller unit or detection of a low battery level during battery operations.

The Sleep mode 31 is entered into upon a predetermined event in order to preserve power to more critical components such as system memory, a real-time clock within the micro-controller unit and a configuration file residing in parameter RAM of the micro-controller unit. Two power mode transitions 41 and 42 may occur from the Sleep mode 31. The first transition 41 is from the Sleep mode 31 to the Run mode 30, such as, for example, upon detection of a depressed key of the alphanumeric keyboard or expiration of a sleep timer. The second transition 42 is from Sleep mode 31 to Shutdown mode 32 which usually occurs when the AC-to-DC adapter and the battery packs are decoupled from the computer system and there is no power being applied to the computer system for a certain period of time (e.g., three minutes). After entering Sleep mode 31, computer system remains in this mode until any event chosen according to a desired configuration causes one of the above-mentioned power mode transitions to occur.

Figure 4:
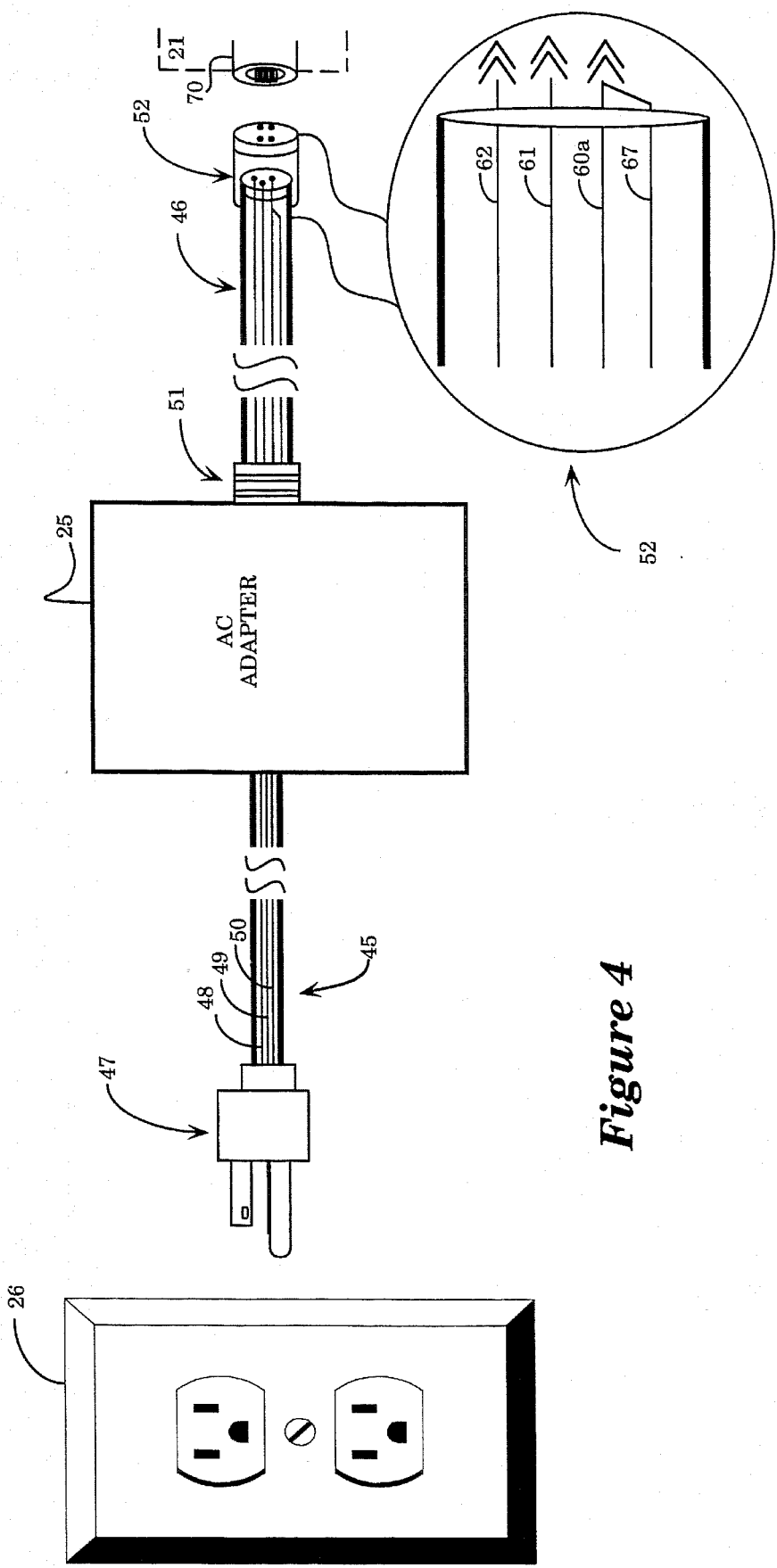
FIG. 4 is a diagram of the external AC-to-DC power adapter.

In Shutdown mode 32, only a few critical circuits within the computer system are powered, usually the micro-controller unit which controls power allocation, contains the real-time clock so that dates and times are not lost and contains parameter RAM with state information, such as setup configurations of the display. The Shutdown mode 32 has mode transition 43. Transition 43 from the Shutdown mode 32 to the Run mode 30 occurs when the user performs a certain key stroke and the battery level is greater than a threshold limit such as five-percent ("5%"), for example. The computer system remains in this Shutdown mode 32 until the above criteria are met Referring now to FIG. 4, the AC-to-DC adapter 25 comprises a detachable AC input cable 45 and a DC output cable 46. The AC input cable 45 includes a male connector (e.g., IEC320) 47 appropriately coupled to three conductor lines; namely, Line 48, Neutral 49 and Ground 50. The connector 47 is connected to the AC wall outlet 26 to provide power to the AC-to-DC adapter 25. The DC output cable 46, preferably about six feet in length and smaller in diameter than conventional DC output cables (discussed below), includes a molded strain relief 51 at a first end coupled to the AC-to-DC adapter 25 and a molded female connector 52 for coupling to a power connector 70 within the computer system 20.

Figure 6A:
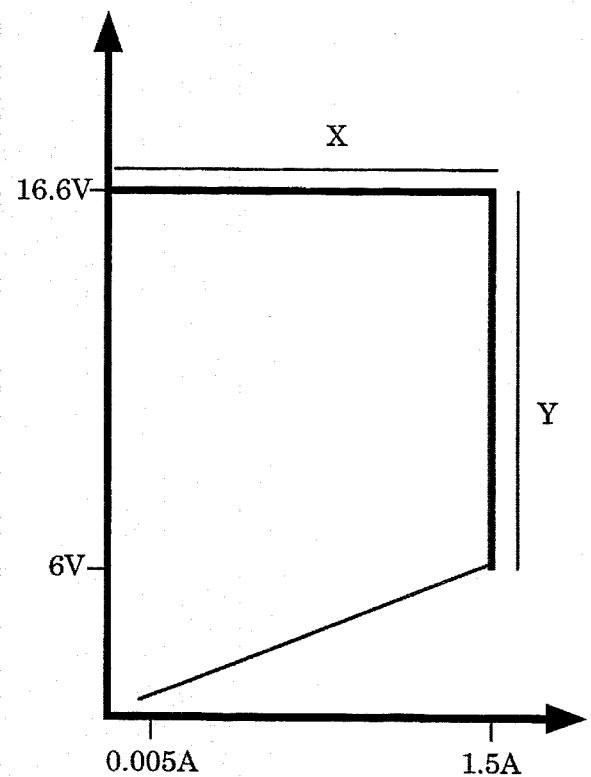
FIGS. 6A–6B are I–V curves of the first and second power outputs from the AC-to-DC adapter.
Figure 6B:
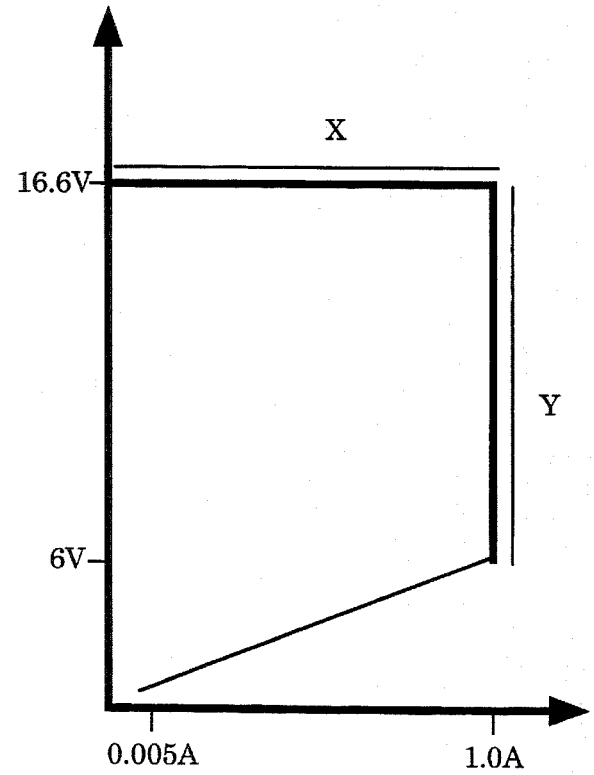

The molded female connector 52 supplies two independent adapter power outputs via a first and second adapter power lines 61 and 62 to the computer system. More specifically, the AC-to-DC adapter 25 supplies a first power output having a constant current regime of approximately 1.5 Amperes ("A") for voltages between 6–16 Volts ("V") and a constant voltage regime (limited at 16.6 V) for currents between 0.005 A and 1.5 A as shown in an I–V curve of FIG. 6A. The AC-to-DC adapter 25 further supplies a second adapter power output having a current regime of approximately 1.0 A for 6 V–16 V a constant voltage regime constant limited at 16.6 V for 0.005–1.0 A as shown in an I–V curve of FIG. 6B. The constant current regime, labeled as area "Y" in FIGS. 6A and 6B, is ideal for charging Nickel Cadmium ("NiCad") and Nickel Metal Hydride ("NiMH") batteries (hereinafter referred to collectively as "Nickel-based batteries") while the constant voltage regime, labeled as area "X" in FIGS. 6A and 6B, is ideal for charging Lithium-ion ("Li-Ion") batteries. For achieving the above voltages, in their preferred embodiment, the NiCad batteries and the NiMH batteries include eight battery cells connected serially while the Li-Ion battery includes four battery cells connected serially; however, it is contemplated that more or less battery cells could be connected serially to obtain greater or lesser total output voltage.

In a preferred embodiment, the first adapter power output is primarily dedicated to providing power to run the computer system and the second adapter power output is primarily dedicated to charging the battery packs. Additionally, the first adapter power output can source a peak demand of up to 2 A for 100 milliseconds ("ms") to charge 200 micro-farads ("μF") of input capacitance on the DC-to-DC regulators of the computer. The peak demand source capability does not interfere with the AC-to-DC adapter's ability to charge batteries in a constant current regime since the time constant of interest for charging a battery is so much larger that a 100 ms surge capability of the AC-to-DC adapter.

The DC output cable 46 of the AC-to-DC adapter 25 is much smaller in thickness than a conventional DC output cable which enables the AC-to-DC adapter 25 to utilize less space because the DC cable 46 can be easily wrapped around the AC-to-DC adapter 25. The smaller thickness of the DC output cable 46 is accomplished by a ground sense line 67 for remotely sensing a ground potential at terminal 60b of the ground line 60a (collectively referred to as "the ground line 60") proximate to the female connector 52 and returning the ground potential back into the first and second adapter power outputs to achieve a tighter tolerance of the voltage outputted at the connector 52. Such feedback is accomplished by control circuits 53a and 53b illustrated in FIG. 5.

The DC output cable 46 includes the first and second power lines 61 and 62 being basically thin wires which have high cable impedance. The ground line 60a is also thin thereby having a higher impedance than that of conventional thick wires used for conducting these levels of current.

When there is a high load demand (i.e., high current flow on the wires), the voltage drops across the power lines 61, 62 and 60a will be substantial. This voltage drop is then sensed by ground sense 67 and fed back to control circuits 53a and 53b. The control circuits 53a and 53b include comparators so that the outputs of the AC-to-DC adapter 25 will be adjusted to compensate the additional voltage drop across power lines 61, 62, 60a by activating or deactivating a corresponding voltage modifying transistors 58 and 59 respectively, with greater or lesser frequency (see FIG. 5). Since ground sense 67 does not carry current, it can be constructed as a thin wire. With ground sense 67, the DC output cable 46 can be thin in diameter and still provide regulated output voltages from the female connector 52.

Figure 5:
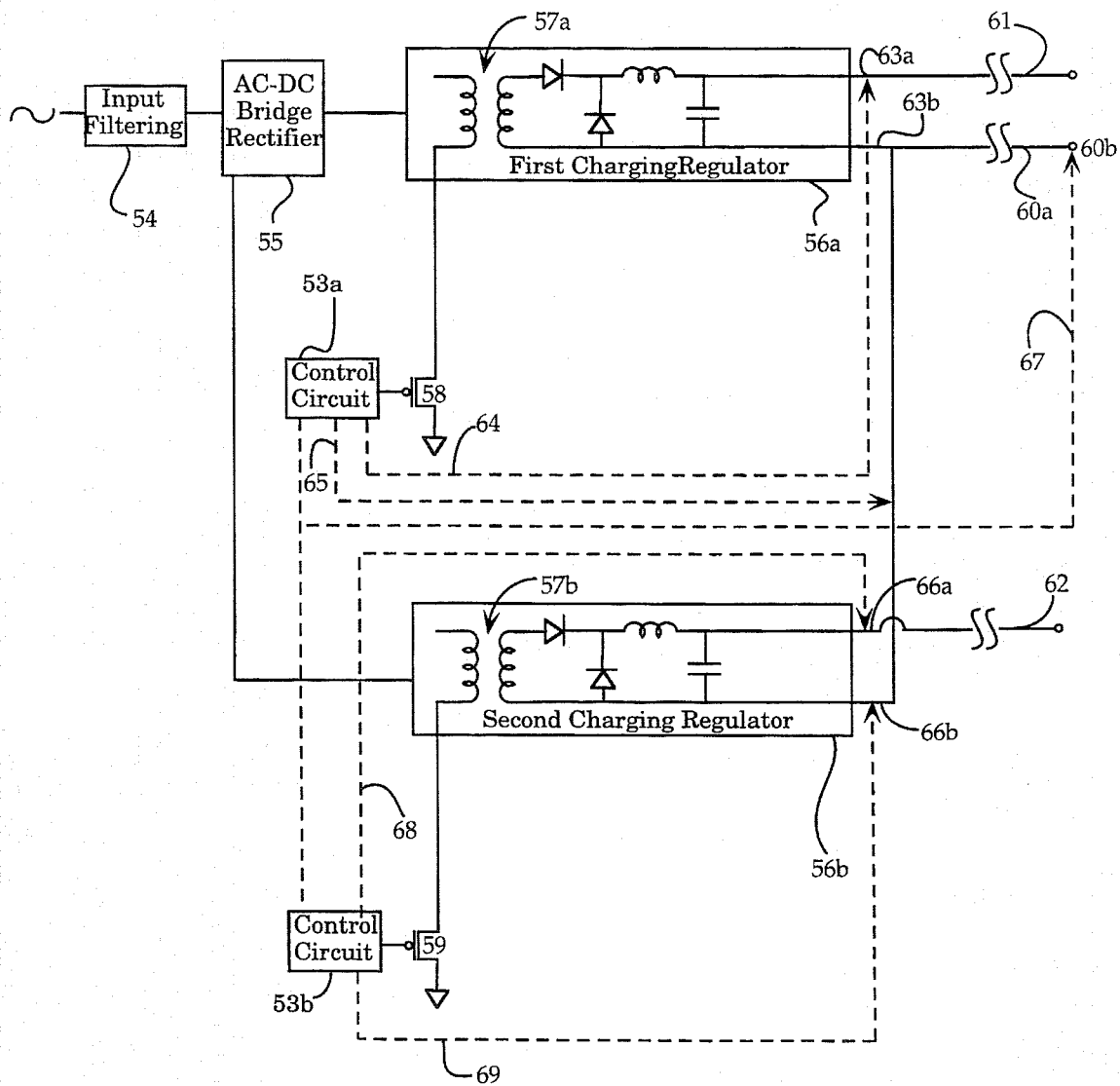
FIG. 5 is a more detailed view of the inner circuitry of the external AC-to-DC adapter.

As shown in FIG. 5, the AC-to-DC adapter 25 comprises a conventional filtering input 54 for filtering AC power output from the AC wall outlet 26 before being rectified. The AC power output is then rectified by a conventional AC-DC bridge rectifier 55 for conversion to DC power output. The DC power output is input into a first and second regulator 56a and 56b conforming to a forward topology for higher efficiency than other topologies. The higher efficiency reduces excess heat generation, allowing for a more portable and convenient enclosure for the AC adapter circuitry. The first and second charging regulators 56a and 56b manipulate the DC power output to enable power to propagate through the transformers 57a and 57b within the charging regulators 56a and 56b, respectively.

The first control circuit 53a is coupled to a first voltage modifying transistor 58 to alter output voltage from the first charging regulator 56a and is further coupled to a power output 63a and a ground output 63b of the first charging regulator 56a through voltage sensing lines 64 and 65, respectively (illustrated as dotted lines). The control circuit 53a reads the voltages at the power output 63a and ground output 63b to obtain the output voltage from the first charging regulator 56a.

In addition, the control circuit 53a reads the voltage of the ground line 60a at terminal end 60b of the DC output cable 46 through voltage sense line 67 because the DC output cable 46 experiences voltage loss between the first charging regulator 56a and the terminal end 60b of the DC output cable 46. To compensate for the voltage loss, the control circuit 53a compares the voltages at the power output 63a, the ground output 63b and the ground sense 67, and thereafter, commences to activate/deactivate the first voltage modifying transistor 58 at a different frequency. The voltage loss is correlated to a load needed by the computer system (e.g., in Shutdown mode, the voltage loss is negligible).

Similarly, the second control circuit 53b is coupled to a second voltage modifying transistor 59 to alter output voltage from the second charging regulator 56b. The second control circuit 53b is further coupled to a power output 66a and a ground output 66b of the second charging regulator 56b and the ground output 60a through voltage sense lines 68, 69 and 67, respectively, to support operations identical to those described above.

The basic building blocks of a conventional single output AC-to-DC adapter and description of AC power flowing therethrough is well known in the state of the art of electrical engineering. The novel feature applicable to the AC-to-DC adapter 25 is that it provides a pair of adapter power lines 61 and 62 with control circuitry to adjust for voltage drop in the DC output cable 46 and provides outputs with both a constant regulated current regime and a constant regulated voltage regime for charging batteries.

Figure 7:
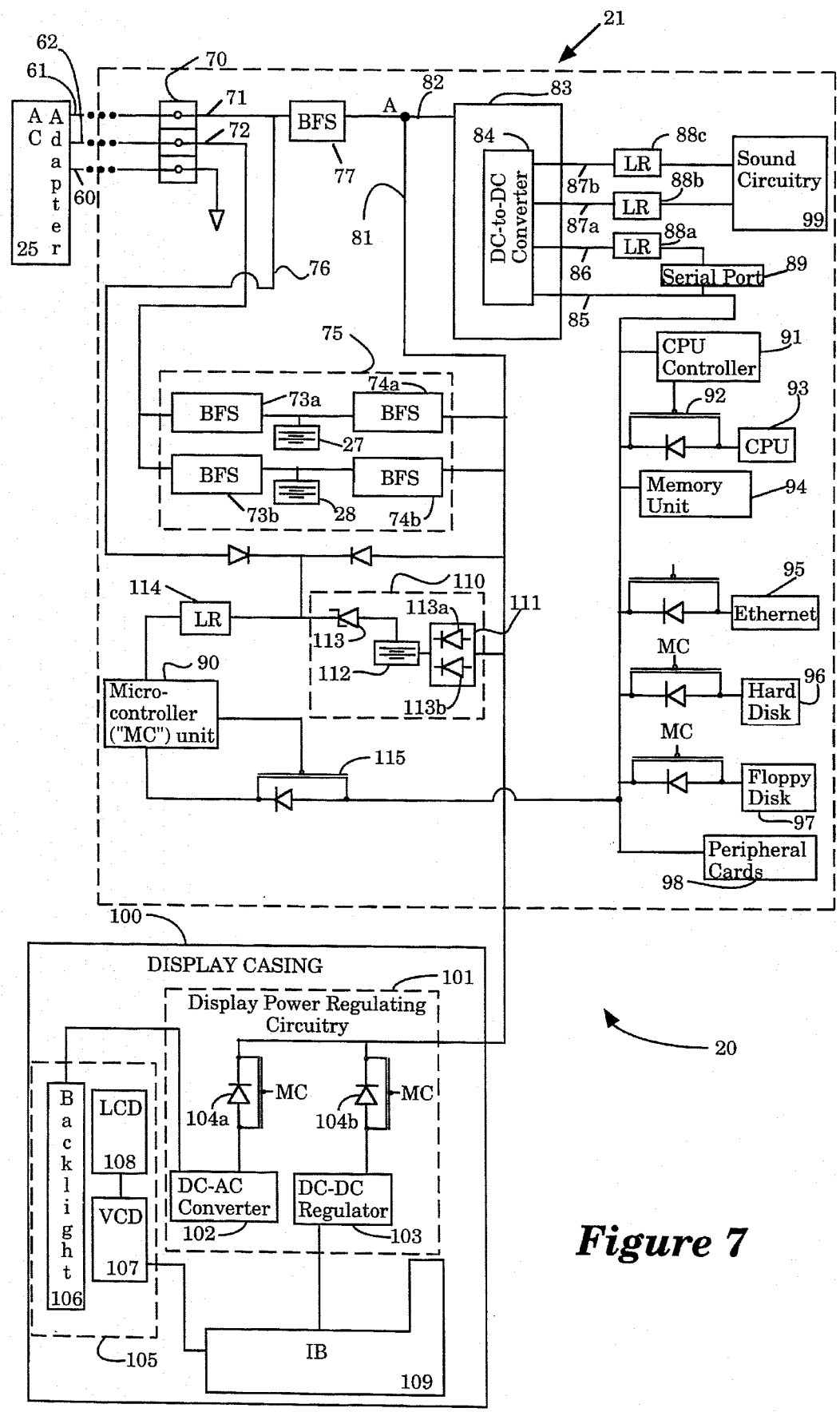
FIG. 7 is a circuit diagram of a power distribution system of the present invention which reduces thermal dissipation through the main computer casing.

Referring now to FIG. 7, an embodiment of the power distribution system, namely a power regulation circuit within the main computer casing and display power regulating circuitry within a display casing implemented within the computer system 20 is illustrated. This figure and the following figures illustrate field effect transistors ("FET switches") such as FET switches 92, 115, etc. with intrinsic substrate diodes for reference to clarify FET orientation in the circuits. The AC-to-DC adapter 25 may be coupled to the power connector 70 within the main computer casing 21 to provide power to the computer system 20 through a first and second input power lines 71 and 72. The first input power line 71 enables transmission of the first adapter power output into the computer system 20 while the second input power line 72 enables transmission of the second adapter power output.

The second input power line 72 is coupled to a first and a second "bilateral field effect transistor switch" (hereinafter referred to as a "bilateral FET switch" and identified in the figures as "BFS") 73a and 73b of a battery switching circuit 75 to enable the AC-to-DC adapter 25 to selectively charge one battery pack 27 or 28 during normal operation of the computer system. In certain situations, however, it is also possible to simultaneously charge the first or second battery packs 27 or 28 (i.e. the battery pack not being charged) through a second charge path in addition to the battery pack being charged through the second input power line 72. This second path is made possible by transmitting the first adapter power output 61 through an auxiliary power line 81 coupled to the first input power line 71 at node A and correspondingly activating either a third or fourth bilateral FET switch 74a or 74b of the battery switching circuit 75. Furthermore, it is possible to charge one battery at a high current rate by coupling the first and second adapter power lines 61 and 62 to charge either the first battery by simultaneously activating the first, third and a fifth bilateral FET switches 73a, 74a and 77, or charging the second battery by simultaneously activating the second, fourth and fifth bilateral FET switches 73b, 74b and 77. The operation of the battery switching circuit 75 for charging and discharging one or both battery packs 27 and/or 28 is disclosed in U.S. Patent Application by David B. Townsley and James J. Blanc entitled "A CIRCUIT OFFERING SEQUENTIAL DISCHARGE AND SIMULTANEOUS DISCHARGE FOR A MULTIPLE BATTERY SYSTEM AND METHOD FOR CHARGING MULTIPLE BATTERIES" (U.S. patent application Ser. 08/241,594 filed on May 12, 1994) is incorporated herein by reference.

The first input power line 71 is coupled to the fifth bilateral FET switch 77 proximate to node A. The fifth bilateral FET switch 77 is enabled (i.e., closed) to allow the first adapter power output to pass therethrough or is disabled (i.e., open) to impede any power flow. This power flow can be disabled from either direction including from the first adapter power output through the fifth bilateral FET switch 77 or from the batteries 27 and 28 back out through the fifth bilateral FET switch 77 via either the third or fourth bilateral FET switches 74a or 74b (if enabled).

Figure 8:
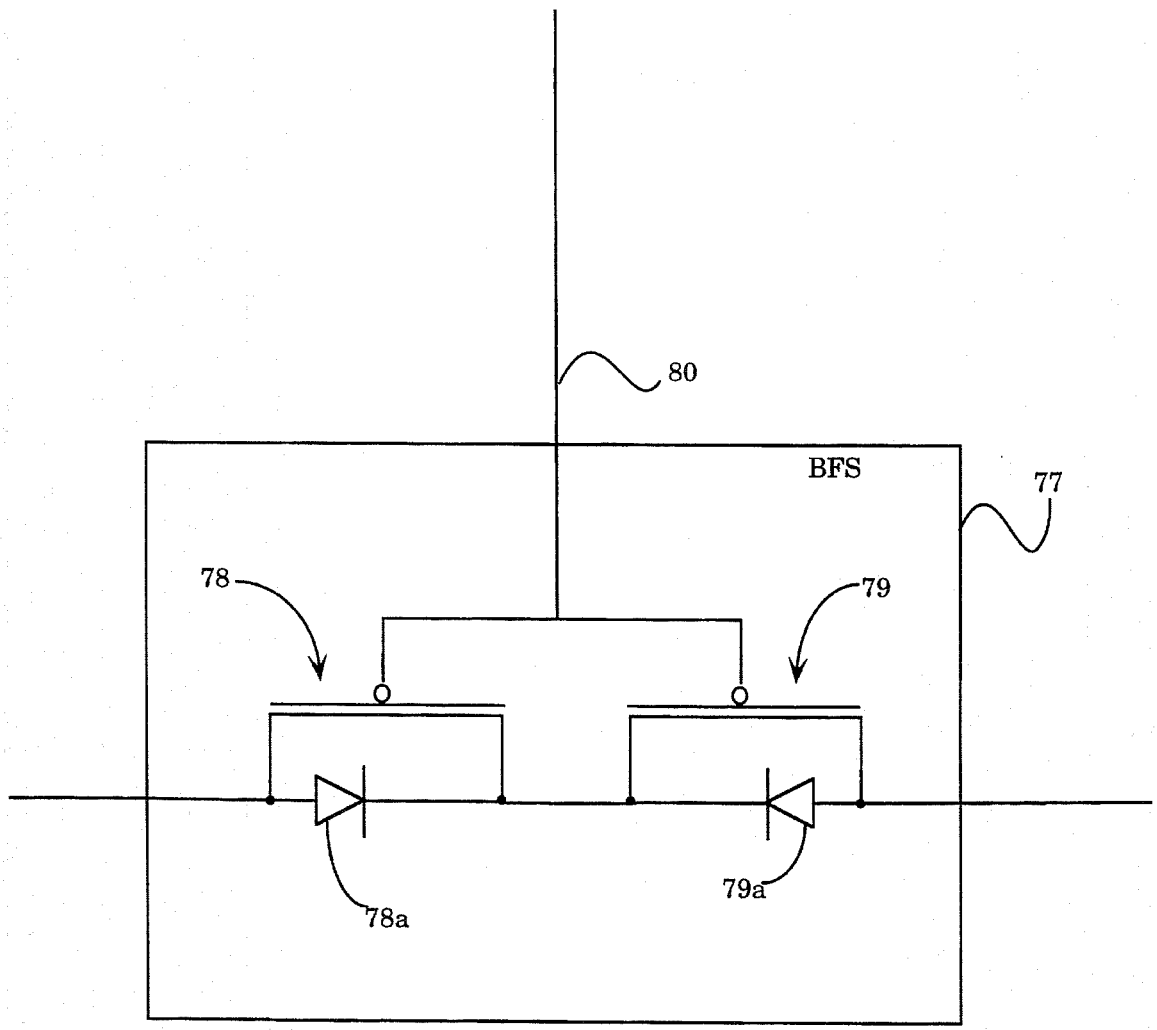
FIG. 8 is a circuit diagram of a bilateral FET switch connected to the micro-controller unit.

As shown in FIG. 8, the fifth bilateral FET switch 77 comprises two conventional FET switches 78 and 79 (e.g., part number SI9430DY or equivalent) in series, but in reversed orientation with respect to each other such that intrinsic substrate diodes 78a and 79a corresponding to the FET switches 78 and 79 are oriented in opposite directions. The benefit in using these two FET switches 78 and 79 together to construct the fifth bilateral FET switch 77 is that current flow is impeded in both directions when the two FET switches 78 and 79, sharing an identical control line 80, are inactive. The control line 80 is generally coupled to a well-known voltage level-shift circuit (e.g., part number 2N3904 or equivalent) which in turn is coupled to the micro-controller unit 90. This construction is identical to those constructions of other bilateral FET switches referenced herein. This construction is also important to the reliability of A/D voltage measurements by the micro-controller unit 90 on the first and second input power lines 71 and 72 to determine presence or absence of the AC-to-DC adapter 25, and on a terminal connections of the first and second battery packs 27 and 28 to determine absence or presence and optionally charge the battery packs 27 and 28, respectively.

Referring back to FIG. 7, node A is a interconnection point between the auxiliary power line 81 and a first power input line 82 of a motherboard switching regulator 83. The first power input line 82 allows power from the AC-to-DC adapter 25 or from one of the battery packs 27 and 28 to be input into the motherboard switching regulator 83. The motherboard switching regulator 83 includes a DC-to-DC regulator 84 which receives power transmitted along the first power input line 82 and generates a plurality of regulated power outputs having predetermined power levels for transmission through corresponding power lines to various components and devices within the computer system 20.

The motherboard switching regulator 83 generates a first regulated power output (5 V, 5.4 A) through a first regulator power line 85. The first regulator power line 85 is coupled to a serial port 89 along with negative voltage provided from regulator 88a for driving positive and negative differential line voltages to external serial communication devices. The first regulator power line 85 is further coupled to a number of core components and input and/or output devices including, but not limited to, a CPU controller 91 which deactivates a FET switch 92 disconnecting power to the CPU 93 when idle, a memory unit 94 (e.g., RAM, ROM, VRAM, etc.), communication circuitry (e.g., Ethernet) 95, a hard disk drive 96, a floppy disk drive 97, a peripheral card 98 (e.g., fax cards, modem cards, etc.) and the micro-controller unit 90. The power coupling between at least the CPU 93, communication circuitry 95, disk drives 96 and 97 and the micro-controller unit 90 is selective by implementing a FET switch between these devices and the first regulator power line 85. The micro-controller unit 90 may include some external buffering logic to simplify specific implementation requirements for a given computer. Another U.S. Patent Application filed by David B. Townsley and James J. Blanc entitled "Power Fault Protection in a Computer Having Multiple Power Supplies" (U.S. patent application Ser. No. 08/239,749 filed on May 9, 1994) describes one implementation of an external buffering logic and such disclosure is incorporated herein by reference.

Besides generating the first power output, in this embodiment, the motherboard switching regulator 83 generates a second regulated power output (−7 V, 0.2 A) through a second regulator power line 86. The second regulator power line 86 is coupled to a linear power regulator 88a (sometimes referred to as a "linear power supply" and identified to in the figures as "LR") to modify the second regulated power output into a modified power output (e.g., −5 V) to be input into the serial port 89 to provide requisite negative voltage as part of a differential output drive for this serial communication port. Additionally, the motherboard switching regulator 83 generates a third (−7 V, 0.05 A) and fourth (7 V, 0.15 A) regulated power outputs and transmits these regulated power outputs through a third and fourth regulator power lines 87a and 87b, respectively. The third and fourth regulator power lines 87a and 87b are respectively coupled to a pair of linear regulators 88b and 88c to convert these regulated power outputs into −5 V and 5 V DC power outputs with low ripple noise which are, in turn, input into sound circuitry 99 which benefits in performance from having low ripple on its supply voltages.

As previously discussed, the auxiliary power bus line 81, coupled to the fifth bilateral FET switch 77 at node A, supports three distinct operations. A first operation is that the auxiliary power bus line 81 provides unregulated power to a display casing 100 for display purposes, contrary to the conventional power circuit regulating such power within the main computer casing. The display casing 100 houses (i) display power regulating circuitry 101 including a DC-to-AC converter 102 and a DC-to-DC regulator 103 each coupled to the auxiliary power bus line 81 via FET switches 104a and 104b, and (ii) display hardware 105 comprising a backlight 106, a video contrast device ("VCD") 107, a LCD screen ("LCD") 108 and an interconnect board ("IB") 109. The display power regulating circuitry 101 receives, as input, a power output ranging from 6 V–16 V from the auxiliary power bus line 81 in view that power is supplied to the auxiliary power bus line 81 from either the AC-to-DC adapter 25 or one of the battery packs 27 and 28. The DC-to-AC converter 102 converts the DC power at 6 V–16 V into an alternating power output having a certain AC level (i.e., 500 Volts AC) and inputs the alternating power output into the display hardware 105 to power a fluorescent backlight 106. The DC-to-DC regulator 103 converts the incoming DC power output (6 V–16 V) into a regulated 5 V DC power output which is input into the IB 109 and subsequently input into the VCD 107. By locating the DC-to-AC converter 102 and DC-to-DC regulator 103 within the display casing 100 and separate from the main computer casing 21, the main computer casing 21 does not need to dissipate the extra heat load of the display power regulating circuitry 101 as part of motherboard switching regulator 83.

A second operation is that the auxiliary power bus line 81 supports charging of an auxiliary battery 112 or auxiliary battery circuit 110, within the computer system. The auxiliary battery 112 operates as a battery backup in various situations such as, for example, in "Shutdown" mode (discussed below) or in "Sleep" mode when the AC-to-DC adapter 25 and the battery packs 27 and 28 are not coupled to the power distribution system and not applying power to the micro-controller unit 90 through a secondary power line 76. The auxiliary battery circuit 110 includes a regulator 111 coupled to the auxiliary power bus line 81 which converts the power output being transmitted on the bus line 81 into an appropriate level (e.g., 6.6 V max.) for charging the auxiliary battery 112, generally a pair of Lithium coin-cell batteries in series. The regulator 111 includes a pair of diodes 113a and 113b which prevents the auxiliary battery 112 from discharging power into the regulator 111 when no power is being supplied to the regulator 111 (i.e., prevents parasitic discharge). A linear regulator 114 is coupled to the auxiliary battery 112 to enable it to discharge regulated 5 V power to the micro-controller unit 90 upon in those events identified immediately above, where no primary power is available from main batteries or AC-to-DC adapter.

A third operation supported by the auxiliary power bus line 81 is to enable the computer system 20 to be powered by either the first and second battery packs 27 and 28 from the battery switching circuit 75. To enable one of the battery packs to power the computer system, the micro-controller unit 90 needs to activate either the fourth or fifth bilateral FET switches 74a and 74b of the battery switching circuit 75. As a result, power may be applied to (i.e., charging) or discharged from either the first battery pack 27 if the fourth bilateral FET switch 74a is activated or the second battery pack 28 if the fifth bilateral FET switch 74b is activated.

Referring now to FIG. 9, an example of the computer system 20 operating in the Run mode is illustrated in which the AC-to-DC adapter 25 is its primary power source and the first battery pack 27 is being charged concurrently. The power lines transmitting power through the computer system 20 are illustrated in bold. In this example, the AC-to-DC adapter 25 provides the first adapter power output 61 and the second adapter power output 62 to the first and second input power lines 71 and 72, respectively. Since it is desirable to charge the first battery pack 27 while still powering the core components, the micro-controller unit 90 enables the first bilateral FET switch 73a of the battery switching circuit 75 to allow the second adapter power output 62 to pass into the first battery pack 27 while the second bilateral FET switch 73b remains disabled so as to impede the second adapter power output from charging the second battery pack 28. In addition, the third bilateral FET switch 74a and fourth bilateral FET switch 74b are kept disabled to allow the full power of the first adapter power output 61 to serve the computer load 21.

Furthermore, in order to utilize the power provided by the AC-to-DC adapter 25, the micro-controller unit 90 enables the fifth bilateral FET switch 77 to allow the first adapter power output 61 to be input into the motherboard switching regulator 83 which, in turn, generates a plurality of power outputs having various voltage and current levels for use by core components and other devices, including the micro-controller unit 90. The fifth bilateral FET switch 77 further allows the first adapter power output 61 to be transmitted through the auxiliary power bus line 81. Thus, the third and fourth bilateral FET switches 74a and 74b of the battery switching circuit 75 are disabled to avoid diverting power from computer operations which could result in system failure or unregulated charging of batteries as system load varies. Moreover, a linear regulator 114 remains disabled and diode 113c remains reverse biased to prevent the micro-controller unit 90 from drawing power from the auxiliary battery 112 when alternative power is available.

In this mode, two devices are receptive to the power outputs from the external AC-to-DC adapter 25 through auxiliary bus 82b; namely, the regulator 111 and the display power regulating circuitry 101. The regulator 111 for the auxiliary battery circuit 110 properly charges the auxiliary battery 112. The components within the display casing 100 are powered to display information on the LCD 108 and to provide backlight for the LCD 108.

Referring to FIG. 10, the computer system 20 is illustrated in Run mode in which the first battery pack 27 is its primary power source while certain idle subsystems are powered-down. In this case, the fifth bilateral FET switch 77 is disabled by the micro-controller unit 90 so that power from the first battery pack 27 is solely input into the display casing 100 and the motherboard switching regulator 83 for distribution. In an effort to conserve battery power, the micro-controller unit 90 further disables those core components and various subsystems which are detected as idle such as, for example, a hard disk and a floppy disk, and disables bilateral FET switches 73a, 73b and 74b. The backlight 106 is powered down by disabling FET switches 104a through the micro-controller unit 90 when the LCD 108 is idle.

Figure 11:
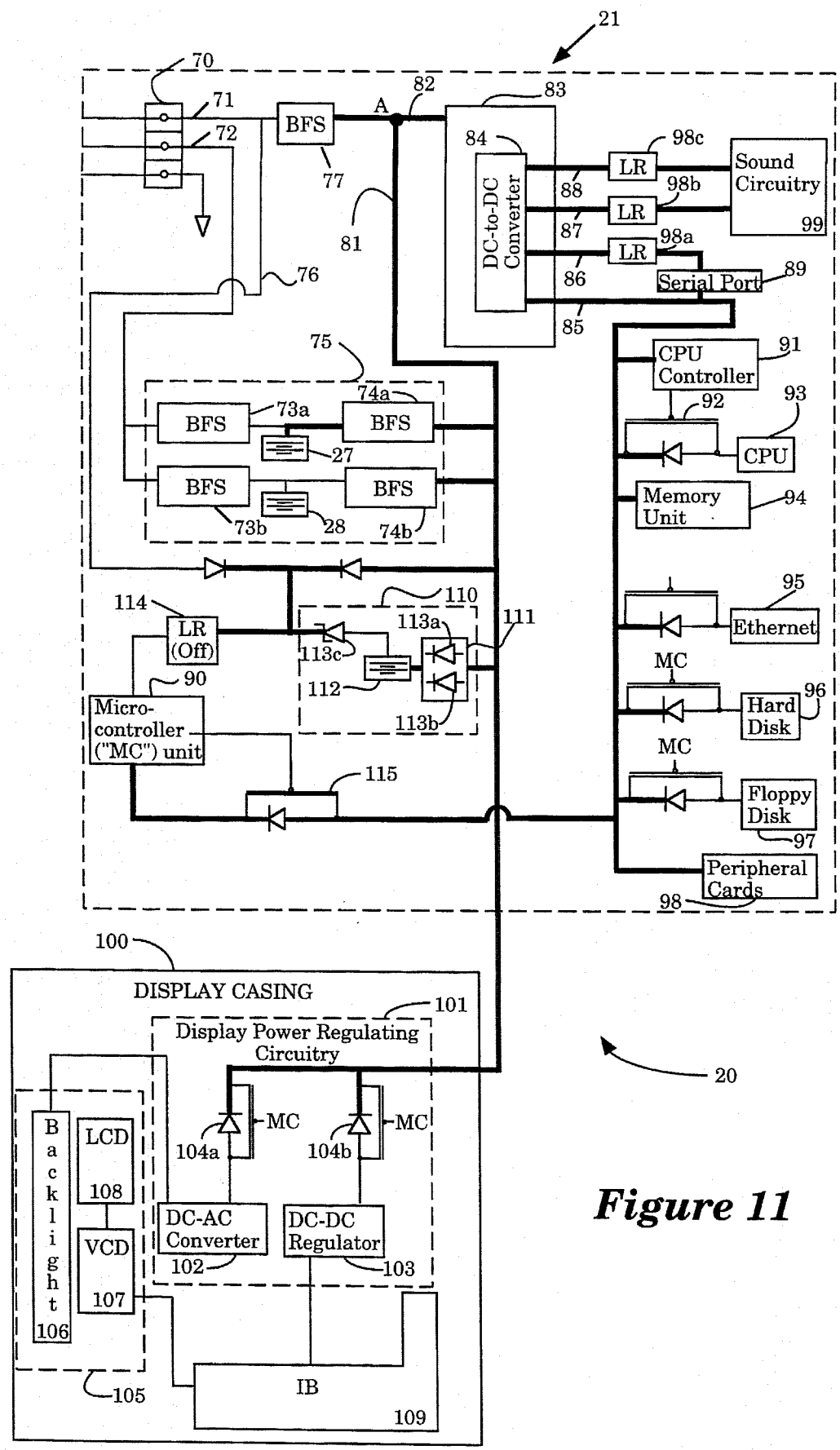
FIG. 11 is a detailed block diagram of the power distribution system of the computer system operating in Sleep mode in which a battery pack is a primary power source of the computer system.

Referring to FIG. 11, the computer system operating in the Sleep mode being powered by the first battery pack 27 is illustrated. In Sleep mode, the micro-controller unit 90 disables those FET switches 104a and 104b coupled between the auxiliary power bus line 81 and the DC-to-AC converter 102 and the DC-to-DC regulator 103, respectively. This is to remove power from the display hardware for power conservation reasons. Also, a FET switch 115 is kept active to run the micro-controller unit 90 from 5 V transmitted by the first regulator power line 85 from DC-DC converter 84, since it is desired to not use the auxiliary battery 112 in this mode. Also, as many power subsystems that can be powered down are powered down, such as CPU 93, Ethernet 95, hard disk 96, floppy disk 97, while memory state is kept refreshed through power to memory unit 94.

Figure 12:
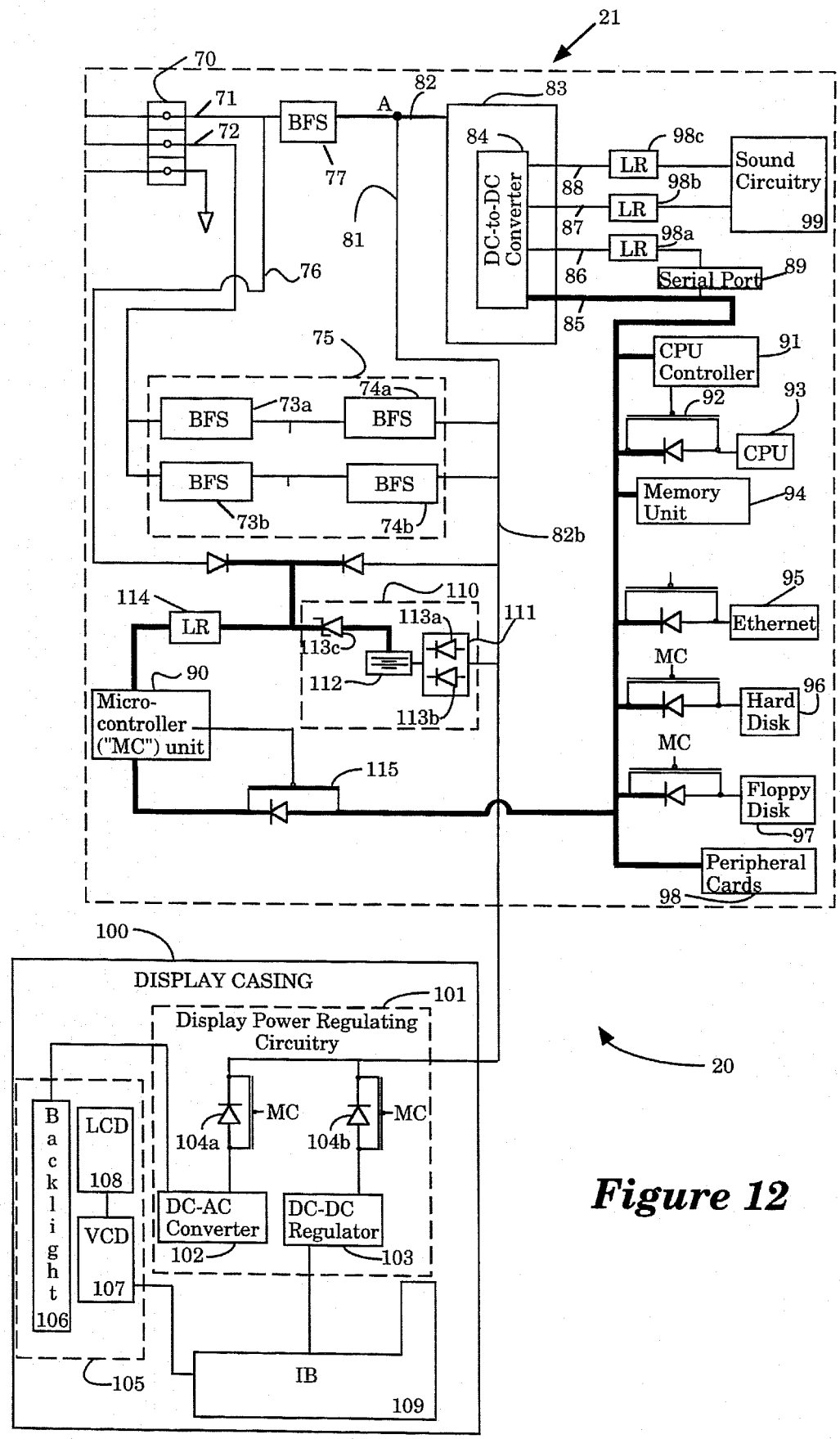
FIG. 12 is a detailed block diagram of the power distribution system of the computer system operating in Sleep mode in which a backup battery is a primary power source of the computer system.

Referring to FIG. 12, the computer system operating in the Sleep mode being powered by the auxiliary battery circuit 110 is illustrated. As shown, both the battery packs 27 and 28 and the AC-to-DC adapter 25 are removed from the computer system. The lack of available power causes a diode 113c to forward bias providing power from the auxiliary battery 112 into a 5 V power output through the linear regulator 114 for use by the micro-controller unit 90.

The micro-controller unit 90 further enables a FET switch 115 coupled between the micro-controller unit 90 and the first regulating power line 85 to allow the 5 V power output to be transmitted from auxiliary battery 112 through the first regulating power line 85 in order to supply at least the core components and certain other devices (if necessary) with power. The system memory 92 (e.g., system RAM) is supplied power to maintain the user's program data and program state so that the computer system returns to its state prior to entering Sleep mode.

Figure 13:
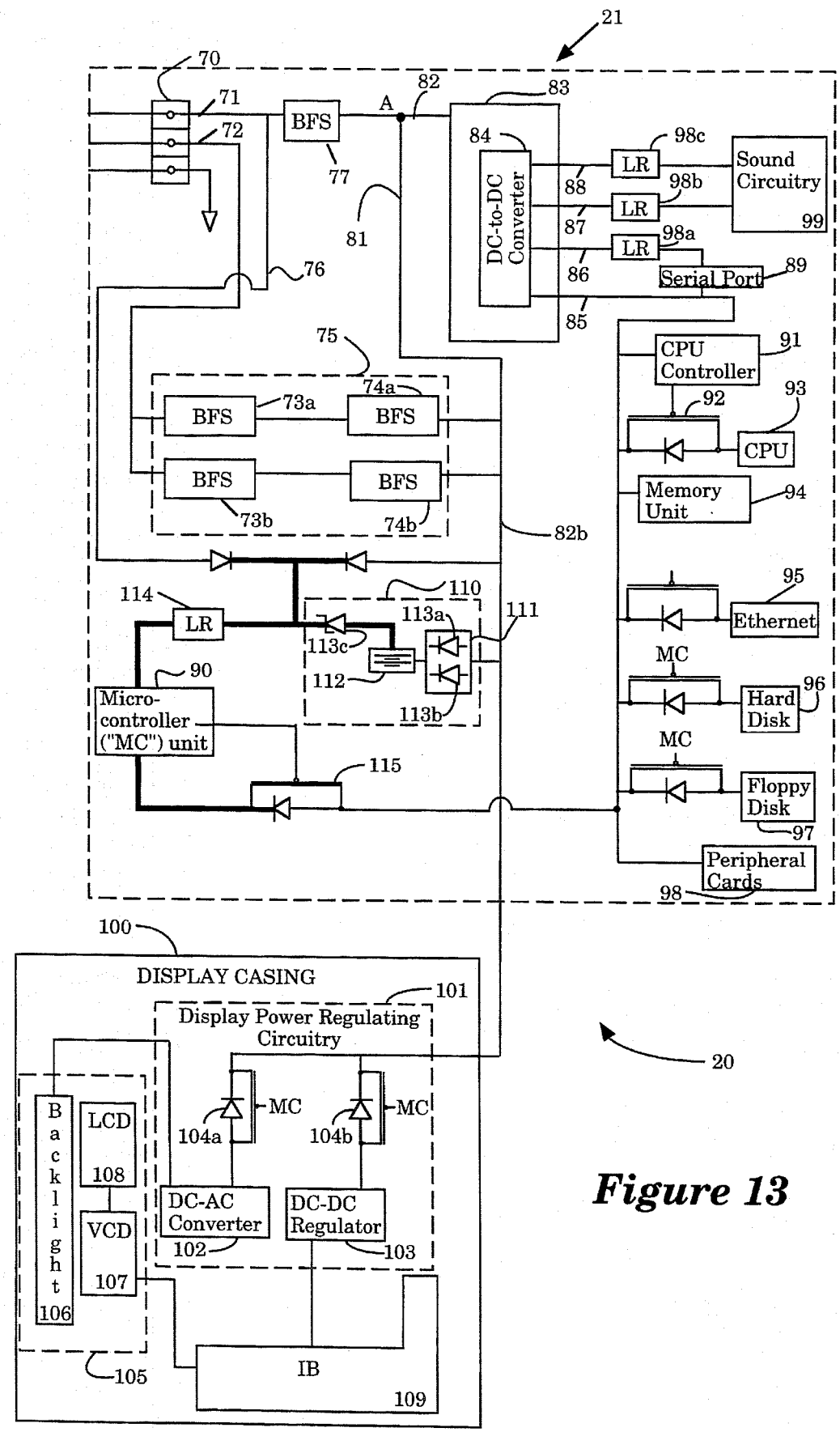
FIG. 13 is a detailed block diagram of the power distribution system of the computer system operating in Shutdown mode in which the backup battery is a primary power source of the computer system.

Referring to FIG. 13, the computer system operating in the Shutdown mode being powered by the auxiliary battery source 110 is illustrated. Similar to the situation in FIG. 10, the micro-controller unit 90 activates the linear regulator 114 to convert power from the auxiliary battery 112 into a 5 V power output for use by the micro-controller unit 90. Thus, power is still supplied to the micro-controller unit 90. However, the micro-controller unit 90 refrains from enabling the FET switch 115 to allow the 5 V power output to be transmitted through the first regulator power line 85 in order to keep power usage as low as possible.

Whereas many alterations and modifications of the present invention will no doubt become apparent to a person of ordinary skill in the art after having read the foregoing description, it is to be understood that the particular embodiments shown and described by way of illustration are in no way intended to be considered limiting. Therefore, references to details of the preferred embodiment are not intended to limit the scope of the claims which in themselves recite only those features regarded as essential to the invention.

What is claimed is:

1. A system for distributing power within a computer system including a display element implemented within a display casing and a central processing unit ("CPU") implemented within a main computer casing of said computer system, the system comprising:

a micro-controller unit controlling a distribution of power supplied by a selected power source;

a switching regulator coupled to a plurality of regulator power lines, said switching regulator receiving power from said selected power source through a first power input line and generating a plurality of regulated power outputs via said plurality of regulator power lines, wherein at least a first regulated power output is transmitted through a first regulator power line of said plurality of regulator power lines in order to provide power to at least said micro-controller unit;

a battery switching circuit coupled to an auxiliary power line which is coupled to said first power input line., said battery switching circuit including at least one battery pack supplying power to said switching regulator when said micro-controller unit selects said battery pack to be said selected power source; and an auxiliary power source including a charging regulator and a battery, wherein said charging regulator is coupled to said auxiliary power line and charges said battery upon receipt of power through said auxiliary power line, and said battery is coupled to said micro-controller unit and supplies power to at least said micro-controller unit when said micro-controller unit selects said battery to be said selected power source.

2. The system according to claim 1 further comprising display power regulating circuitry within said display casing, said display power regulating circuitry regulates an incoming DC power output being transmitted to said display casing through said auxiliary power line.

3. The system according to claim 2, wherein said display power regulating circuitry includes a DC-to-DC regulator for converting said incoming DC power output into a regulated DC power output and a DC-to-AC converter for converting said incoming DC power output into an AC power output.

4. The system according to claim 2, wherein said micro-controller unit selects said battery pack to be said selected power source by enabling a switch coupled between said battery pack and said auxiliary power line, wherein said battery pack discharges power through said auxiliary power line into said switching regulator and said display power regulating circuitry within said display casing.

5. The system according to claim 4, wherein said micro-controller unit further enables said CPU to receive power from said first regulator power line of said switching regulator by enabling a switch coupled between the CPU and said first regulator power line.

6. The system according to claim 1, wherein said micro-controller unit selects said battery of said auxiliary power source to be said selected power source by enabling a linear regulator coupled between said battery and said micro-controller unit.

7. The system according to claim 1, wherein said switching regulator includes a DC-to-DC regulator, coupled to said plurality of regulator power lines, transmitting said plurality of regulated power outputs, wherein a second regulator power line is coupled to a first linear regulator to provide a selected negative power output to a serial port, a third regulator power line is coupled to a second linear regulator to provide a selected negative power output to a sound circuitry, and a fourth regulator power line is coupled to a third linear regulator to provide a power output of a positive voltage to said sound circuitry.

8. The system according to claim 1 further comprises a power connection circuit including a first and second input power lines, said first input power line being coupled to a power connector at a first end and said switching regulator at a second end and said second input power line being coupled to said power connector at a first end and said battery switching circuit at a second end.

9. The system according to claim 8, wherein said power connection circuit is coupled to an external power source.

10. The system according to claim 8, wherein said first input power line further includes a switch mechanism being controlled by said micro-controller unit, said switch mechanism, when enabled, allows power from said external power source to be supplied to said switching regulator through said first input power line, and said switch mechanism, when disabled, prevents power from being supplied to said switching regulator by said external power source and prevents power supplied by said battery pack from being discharged through said power connector.

11. The system according to claim 9, wherein said external power source is an alternating current-to-direct current ("AC-to-DC") adapter including a first charging regulator which generates a first adapter power output from an AC power output and transmits said first adapter power output through a first adapter power line, and a second charging regulator which generates a second adapter power output from said AC power output and transmits said second adapter power output through a second adapter power line.

12. The system according to claim 11, wherein said first adapter power output has a constant current of a first level and said second adapter power output having a constant current of a second level, wherein said first level is greater than said second level.

13. A power system for distributing power regulation components throughout a computer system including a main computer casing and a display casing, the power system comprising:

a switching regulator incorporated within said main computer casing, said switching regulator generating at least one regulated power output to at least one component within said main computer casing; and at least one display power regulating component incorporated within said display casing of said computer system, said at least one display power regulating component regulates an incoming DC power output from said main computer casing through an auxiliary power output line.

14. The power system according to claim 13 further including a micro-controller unit, wherein upon said micro-controller unit selecting one of a plurality of battery packs to be a selected power source, said selected power source discharges said DC power output through said auxiliary power output line and to said at least one display power regulating component within said display casing.

15. The power system according to claim 13, wherein the power system further includes a plurality of power regulatory components within an external AC-to-DC adapter coupled to at least said switching regulator within said main computer casing through one of a plurality of adapter power lines, said plurality of power regulatory components are configured in series with said plurality of adapter power lines and are connected to a power connector acting as an interface between said main computer casing and said external AC-to-DC adapter.

16. A computer system comprising:

a bus;

a central processing unit ("CPU") coupled to said bus, said CPU, implemented within a main computer casing of said computer system, processes data and program instructions;

a memory unit coupled to said bus, said memory unit, implemented within said main computer casing of said computer system, contains said data and said program instructions;

a display subsystem coupled to said bus, said display subsystem, implemented within a display casing of said computer system, displays said data; and a system for distributing power within said computer system according to its existing mode of operation, said system including a micro-controller unit controlling a distribution of power throughout the computer system which is supplied by a selected power source, a switching regulator coupled to a plurality of regulated power lines, said switching regulator receiving power from said selected power source through a first power input line and generating a plurality of regulated power outputs via said plurality of regulator power lines, wherein a first regulated power output is transmitted through a first regulator power line of said plurality of regulator power lines in order to provide power to at least said micro-controller unit, a battery switching circuit coupled to an auxiliary power line which is coupled to said first power input line, said battery switching circuit includes at least one battery pack supplying power to said switching regulator when said micro-controller unit selects said battery pack to be said selected power source, and an auxiliary power source including a charging regulator and a battery, wherein said charging regulator, is coupled to said auxiliary power line and charges said battery upon receipt of power through said auxiliary power line, and said battery is coupled to said micro-controller unit and supplies power to at least said micro-controller unit when said micro-controller unit selects said battery to be said selected power source.

17. The system according to claim 16, wherein said micro-controller unit selects said battery pack to be said selected power source by enabling a switch coupled between said battery pack and said auxiliary power line, wherein said battery pack discharges power through said auxiliary power line for use by said switching regulator.

18. The system according to claim 16 further comprising display power regulating circuitry within said display casing, said display power regulating circuitry regulates an incoming DC power output being transmitted to said display casing through said auxiliary power line.

19. The system according to claim 18, wherein said display power regulating circuitry includes a DC-to-DC regulator for converting said incoming DC power output into a regulated DC power output and a DC-to-AC converter for converting said incoming DC power output into an AC power output.

20. The system according to claim 16, wherein said switching regulator includes a DC-to-DC regulator coupled to said plurality of regulator power lines for transmitting said plurality of regulated power outputs, wherein a second regulator power line is coupled to a first linear regulator to provide a regulated power output of a first selected negative voltage to a serial port, a third regulator power line is coupled to a second linear regulator to provide a regulated power output of a second selected negative voltage to a sound circuitry, and a fourth regulator power line is coupled to a third linear regulator to provide a regulated power output of a selected positive voltage to said sound circuitry.

21. The system according to claim 18 further comprises a power connection circuit including a first and second input power lines, said first input power line being coupled to a power connector at a first end and said switching regulator at a second end and said second input power line being coupled to said power connector at a first end and said battery switching circuit at a second end.

22. The system according to claim 21, wherein said power connection circuit is coupled to an external power source.

23. The system according to claim 22, wherein said first input power line further includes a switch mechanism controlled by said micro-controller unit, said switch mechanism, when enabled, allows power from said external power source to be supplied to said switching regulator through said first input power line, and said switch mechanism, when disabled, prevents power from being supplied to said switching regulator by said external power source and prevents power supplied by said battery pack from being discharged through said power connector.

24. The system according to claim 23, wherein said external power source is an alternating current-to-direct current ("AC-to-DC") adapter including
   a first charging regulator which generates a first adapter power output from an AC power output and transmits said first adapter power output through a first adapter power output line, and
   a second charging regulator which generates a second adapter power output from an AC power output and transmits said second adapter power output through a second adapter power output line.

25. The system according to claim 24, wherein a first adapter power output has a constant current of a first ampere level and said second adapter power output having a constant current of a second ampere level, wherein said first ampere level is greater than said second ampere level.

26. A method for reducing thermal dissipation within a main computer casing of a computer system incorporating a power regulating circuit, said method comprising the steps of:
   implementing at least one power regulating component within a display casing of said computer system, said at least one power regulating component generating a regulated DC power output after receipt of a DC power output from a switching regulator of said power regulating circuit; and
   implementing at least two power regulatory components which are coupled to a plurality of adapter power lines, wherein when said plurality of adapter power lines are connected to a power connector acting as an interface for said power regulating circuit within said main computer casing, said at least two power regulatory components provide a regulated DC power output transmitted through said plurality of adapter power lines.

27. A power adapter comprising:
   a first charging regulator which generates a first adapter power output from an AC power output through a first adapter power output line;
   a second charging regulator which generates a second adapter power output from said AC power output and transmits said second adapter power output through a second adapter power output line;
   a first control circuit coupled to (i) an output of said first charging regulator coupled to a first end of said first adapter power output line via a first voltage sense line, (ii) a ground output of said first charging regulator via a second voltage sense line and (iii) a ground output at a second end of said first adapter power output line, said first control circuit monitors voltage loss from said first end of said first adapter power output line to said second end of said first adapter power output line to alter the power output of said first charging regulator so that said voltage at said second end of said first adapter power output line is equal to a desired voltage level; and
   a second control circuit coupled to (i) an output of said second charging regulator coupled to a first end of said second adapter power output line via a third voltage sense line, (ii) a ground output of said second charging regulator via a fourth voltage sense line and (iii) a ground output at a second end of said second adapter power output line, said second control circuit controls power from said second charging regulator.

28. The power adapter according to claim 27, wherein said first adapter power output is a power output having a constant current of a first predetermined level for voltages between a first range.

29. The power adapter according to claim 28, wherein said first predetermined level is approximately 1.5 amperes.

30. The power adapter according to claim 27, wherein said second adapter power output is a power output having a constant current of a second predetermined level for voltages between a second range.

31. The power adapter according to claim 30, wherein said second determined level is approximately 1.0 amperes.

32. The power adapter according to claim 27, wherein said first control circuit monitors voltage loss from said first end of said second adapter power output line to said second end of said second adapter power output line to alter the power output of said second charging regulator so that said voltage at said second end of said second adapter power output line is equal to a desired voltage level.

33. A system for distributing power throughout a computer system including a first plurality of components within a main computer casing and a second plurality of components within a display casing, the system comprising:
   a processing unit controlling a distribution of power being supplied by a selected power source being one of the following:
      an external power adapter selectively chosen by said processing unit to supply power to said computer system, said external power adapter including a first charging regulator for supplying a first DC power output through a power connector coupled to said main computer casing,
      a first battery selectively chosen by said processing unit to supply power to said computer system, and
      a second battery selectively chosen by said processing unit to supply power to said computer system;
   a switching regulator for generating at least one regulated power output based on a power input by said selected power source, said switching regulator includes a first power input line receiving said power input from said selected power source and at least one regulator power line transmitting said at least one regulated power output to at least one component of said first plurality of components; and
   at least one display power regulating component within said display casing, said display power regulating component generating a regulated DC power output upon receipt of an incoming DC power output from said selected power source via an auxiliary power output line within said main computer casing.

34. A power system distributing power regulation components outside a main computer casing of a computer system, said power system comprising:
   at least one charging regulator incorporated within a power adapter coupled to the main computer casing, said at least one charging regulator produces at least one adapter power output from an AC power output and provides said at least one adapter power input to the main computer casing; and
   at least one display power regulating component incorporated within a display casing of the computer system, said at least one display power regulating component regulates an incoming DC power output from said main computer casing through an auxiliary power output line.

* * * * *